United States Patent
Hirakawa

(10) Patent No.: US 11,392,286 B2
(45) Date of Patent: Jul. 19, 2022

(54) INFORMATION PROCESSING APPARATUS, DEVICE CONTROL APPARATUS, AND NON-TRANSITORY COMPUTER READABLE MEDIUM FOR AUTOMATICALLY CANCELLING PROHIBITION OF OPERATION OF DEVICE UPON RECEIPT OF INSTRUCTION TO EXECUTE THE OPERATION

(71) Applicant: FUJIFILM BUSINESS INNOVATION CORP., Tokyo (JP)

(72) Inventor: Eri Hirakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/896,558

(22) Filed: Jun. 9, 2020

(65) Prior Publication Data
US 2021/0096735 A1    Apr. 1, 2021

(30) Foreign Application Priority Data

Sep. 30, 2019  (JP) ............................. JP2019-180326

(51) Int. Cl.
*G06F 3/0484*   (2022.01)
*H04N 1/00*    (2006.01)
*G06F 3/04847*  (2022.01)

(52) U.S. Cl.
CPC ..... *G06F 3/04847* (2013.01); *H04N 1/00395* (2013.01); *H04N 1/00411* (2013.01); *H04N 1/00915* (2013.01)

(58) Field of Classification Search
None
See application file for complete search history.

(56) References Cited

U.S. PATENT DOCUMENTS

| 8,566,905 | B2* | 10/2013 | Tanaka | ................. | H04N 1/4433 |
|||||| 726/30 |
| 9,686,441 | B2* | 6/2017 | Tanaka | ............... | H04N 1/00482 |
| 2011/0222100 | A1* | 9/2011 | Tanaka | .................. | G06F 21/608 |
|||||| 358/1.14 |
| 2015/0143506 | A1* | 5/2015 | Sugano | ................. | G06F 3/0622 |
|||||| 726/17 |
| 2016/0105451 | A1* | 4/2016 | Sekiguchi | ............... | G06F 21/74 |
|||||| 726/22 |
| 2018/0285066 | A1* | 10/2018 | Dozen | ................ | H04N 1/00403 |

FOREIGN PATENT DOCUMENTS

| JP | 2011-191952 A | 9/2011 |
| JP | 2015-88837 A | 5/2015 |
| JP | 2017-73035 A | 4/2017 |

* cited by examiner

*Primary Examiner* — Andrew H Lam
(74) *Attorney, Agent, or Firm* — Oliff PLC

(57) ABSTRACT

An information processing apparatus includes: an operation execution receiver that receives an execution of an operation of a device; and an operation prohibition canceler that, when in a state where the device is prohibited from performing the operation, cancels prohibition of the operation of the device upon the execution of the operation being received by the operation execution receiver.

18 Claims, 9 Drawing Sheets ns based on and claims priority under 35

INFORMATION PROCESSING APPARATUS, DEVICE CONTROL APPARATUS, AND NON-TRANSITORY COMPUTER READABLE MEDIUM FOR AUTOMATICALLY CANCELLING PROHIBITION OF OPERATION OF DEVICE UPON RECEIPT OF INSTRUCTION TO EXECUTE THE OPERATION

CROSS-REFERENCE TO RELATED APPLICATIONS

This application is based on and claims priority under 35 USC 119 from Japanese Patent Application No. 2019-180326 filed Sep. 30, 2019.

BACKGROUND

(i) Technical Field

The present disclosure relates to an information processing apparatus, a device control apparatus, and a non-transitory computer readable medium.

(ii) Related Art

Japanese Unexamined Patent Application Publication No. 2011-191952 discloses an electronic device in which application programs can be installed, the electronic device including: a system controller that controls switching between application programs to be displayed on a display unit; a display controller that causes the display unit to display an operation screen corresponding to an application program designated to be displayed by the system controller; and a request receiving unit that receives a request to start exclusive use of the display unit by the application program, and a request to end the exclusive use. In a case where there is an application program for which the request receiving unit has received a request to start the exclusive use, the system controller does not switch the display target from the application program to another application program until a request to end the exclusive use by the application program is received.

Japanese Unexamined Patent Application Publication No. 2017-73035 discloses an information processing apparatus that executes processing related to an application via a processing unit, the information processing apparatus including: an acquisition unit that acquires a setting job that instructs the processing related to the application; a determination unit that determines whether or not the processing unit has an operation authority for processing included in the setting job; a transfer unit that, in a case where the determination unit determines that the processing unit does not have the operation authority for predetermined processing included in the setting job, transfers the operation authority for the predetermined processing to the processing unit; and a deprivation unit that deprives the processing unit of the operation authority for the predetermined processing after completion of the predetermined processing carried out by the processing unit to which the operation authority for the predetermined processing has been transferred by the transfer unit.

Japanese Unexamined Patent Application Publication No. 2015-88837 discloses a display device in which it is possible to set a normal mode, a restricted mode in which at least some functions are restricted, and a semi-restricted mode that can be implemented before transitioning from the normal mode to the restricted mode. The display device includes: a display unit; a receiving unit that receives input by a user; and a setting unit that sets the semi-restricted mode when the receiving unit receives predetermined input, and sets the restricted mode in a case where a screen, displayed on the display unit on the basis of the input by the user immediately after the semi-restricted mode has been set, transitions to a screen that does not satisfy a predetermined condition.

SUMMARY

Aspects of non-limiting embodiments of the present disclosure relate to providing an information processing apparatus, a device control apparatus, and a non-transitory computer readable medium, with which it is possible to cancel the prohibition of an operation of a device without a user performing a cancel operation, when in a state where the device is prohibited from performing the operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: an operation execution receiver that receives an execution of an operation of a device; and an operation prohibition canceler that, when in a state where the device is prohibited from performing the operation, cancels prohibition of the operation of the device upon the execution of the operation being received by the operation execution receiver.

BRIEF DESCRIPTION OF THE DRAWINGS

An exemplary embodiment of the present disclosure will be described in detail based on the following figures, wherein.

DETAILED DESCRIPTION

Next, exemplary embodiments of the present disclosure will be described in detail with reference to the drawings.

Figure 1:
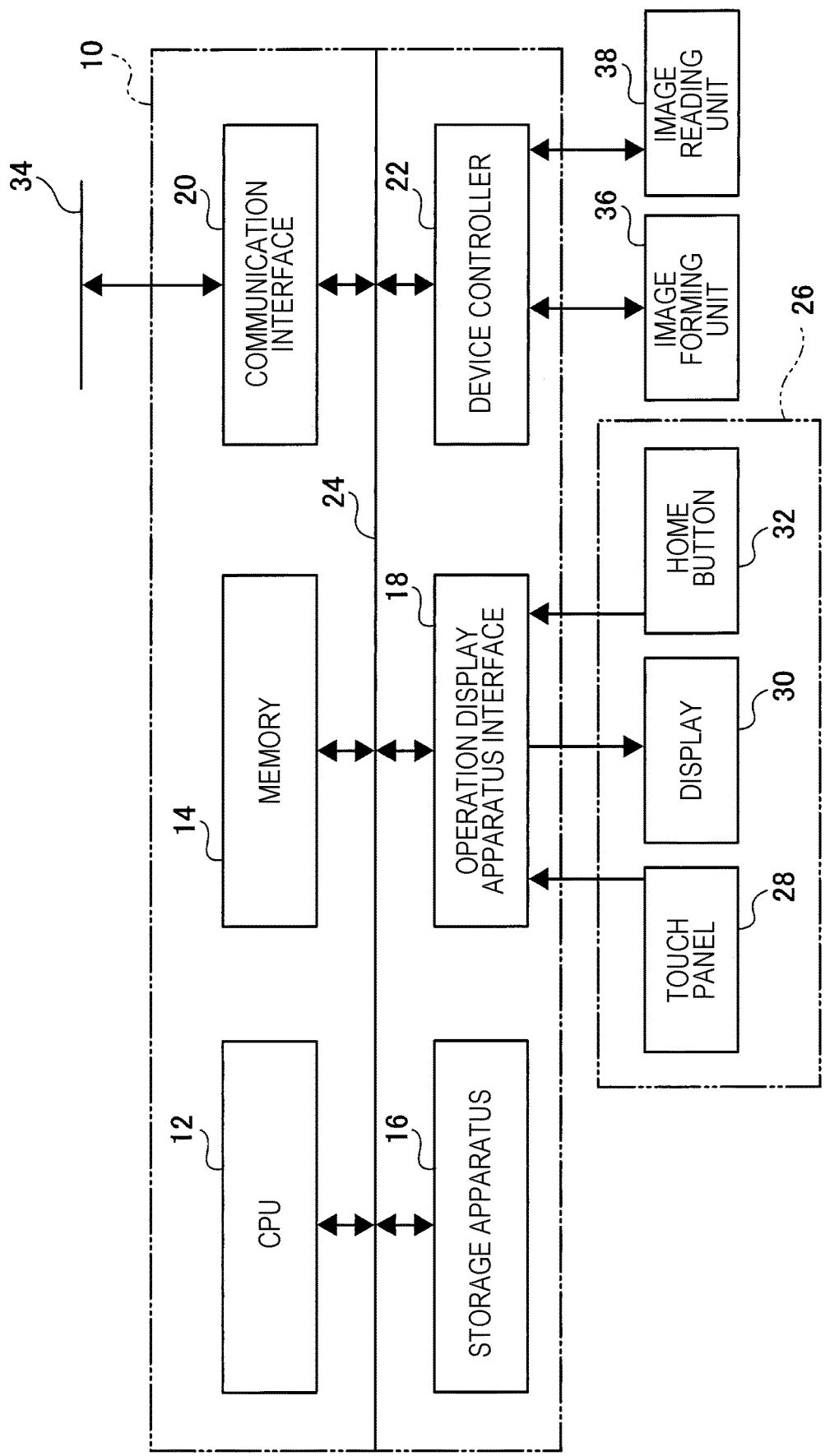
FIG. 1 is a block diagram depicting hardware of an information processing apparatus according to an exemplary embodiment of the present disclosure.

FIG. 1 depicts an information processing apparatus 10 according to an exemplary embodiment of the present disclosure. The information processing apparatus 10 is for controlling a device such as an image forming apparatus.

The information processing apparatus 10 has a CPU 12, memory 14, a storage apparatus 16, an operation display apparatus interface 18, a communication interface 20, and a device controller 22, and the CPU 12, the memory 14, the storage apparatus 16, the operation display apparatus interface 18, the communication interface 20, and the device controller 22 are connected via a bus 24.

The CPU 12 executes predetermined processing on the basis of a control program stored in the memory 14. The storage apparatus 16 is configured of a hard disk, for example, and stores required software and data. The operation display apparatus interface 18 has an operation display apparatus 26 connected thereto. The operation display apparatus 26 is provided with a touch panel 28, a display 30, and a home button 32, and is configured to receive operation data from the touch panel 28 and the home button 32 and to send display data to the display 30.

The communication interface 20 is connected to a terminal apparatus and a server via a LAN (local area network) 34, receives requests for image forming from the terminal apparatus, and transmits images to the terminal apparatus and the server. The communication interface 20 is not restricted to using a LAN and may be connected to a terminal apparatus and a server via the Internet.

The device controller 22 is connected to an image forming unit 36 and an image reading unit 38, causes the image forming unit 36 to form images on a recording medium, and causes the image reading unit 38 to read documents.

Figure 2:
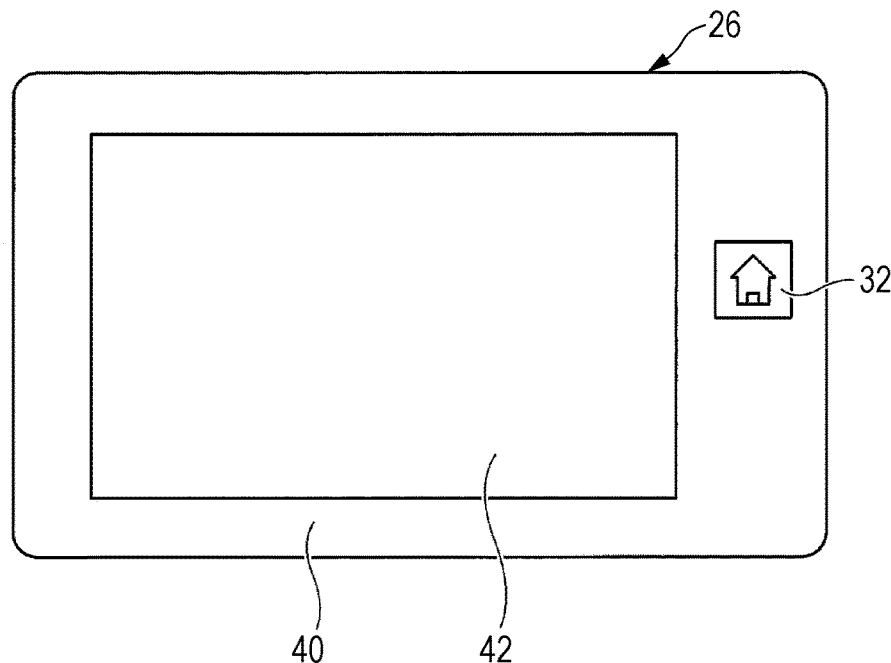
FIG. 2 is a plan view of an operation display apparatus used in an exemplary embodiment of the present disclosure.

FIG. 2 depicts the operation display apparatus 26 used in the exemplary embodiment of the present disclosure. The operation display apparatus 26 has an operation display apparatus main body 40, and this operation display apparatus main body 40 is provided with: a touch panel display 42 in which the aforementioned touch panel 28 and display 30 are combined; and the home button 32. The touch panel display 42 displays various types of operation buttons. The operation buttons displayed on the touch panel display 42 are software buttons that generate operation data when touched by a user, and the home button 32 is a hardware button configured of a mechanical switch. The hardware button and the software buttons are configured such that it is possible to perform input by pressing the hardware button and a software button at the same time; however, the software buttons are configured such that they cannot be pressed at the same time.

Figure 3:
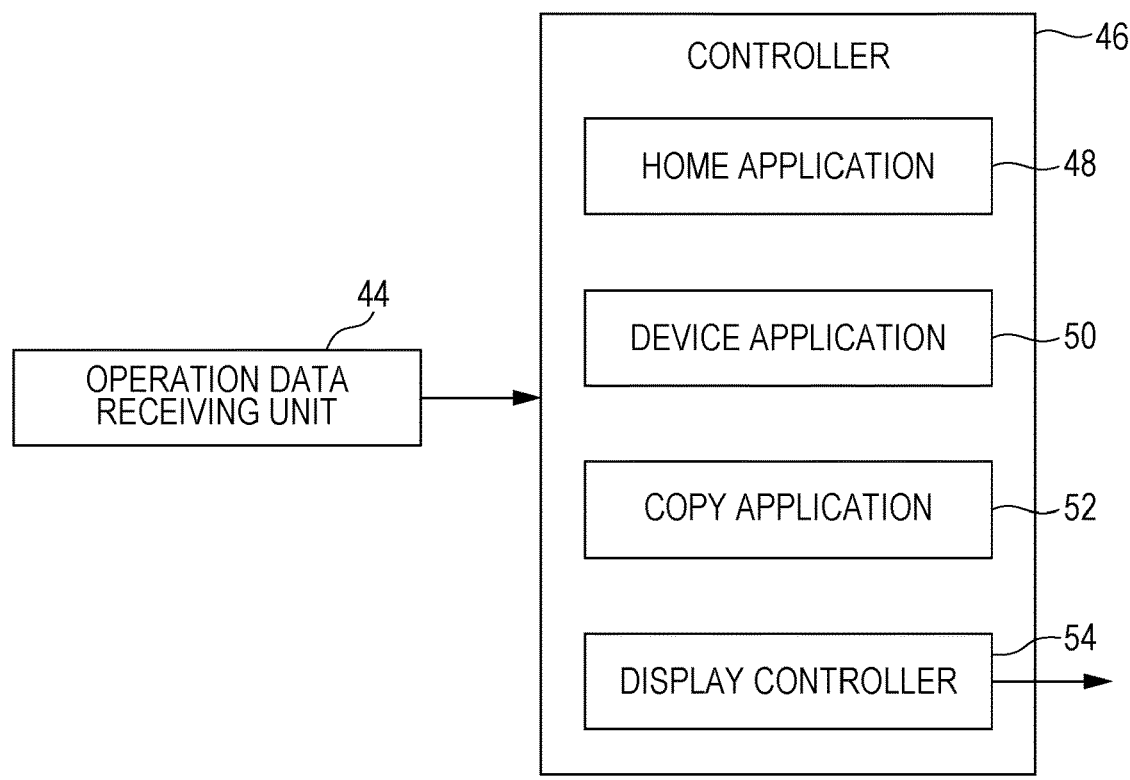
FIG. 3 is a block diagram depicting a software configuration of an information processing apparatus according to an exemplary embodiment of the present disclosure.

FIG. 3 depicts a software group for realizing the functions of the information processing apparatus 10.

The information processing apparatus 10 has an operation data receiving unit 44 that receives operation data. A controller 46 has home application software (hereinafter, referred to as a home application) 48, device application software (hereinafter, referred to as a device application) 50, and copy application software (hereinafter, referred to as a copy application) 52. Furthermore, the controller 46 has a display controller 54 that performs control in such a way that images generated by the applications 48, 50, and 52 are displayed on the touch panel display 42.

Figure 4:
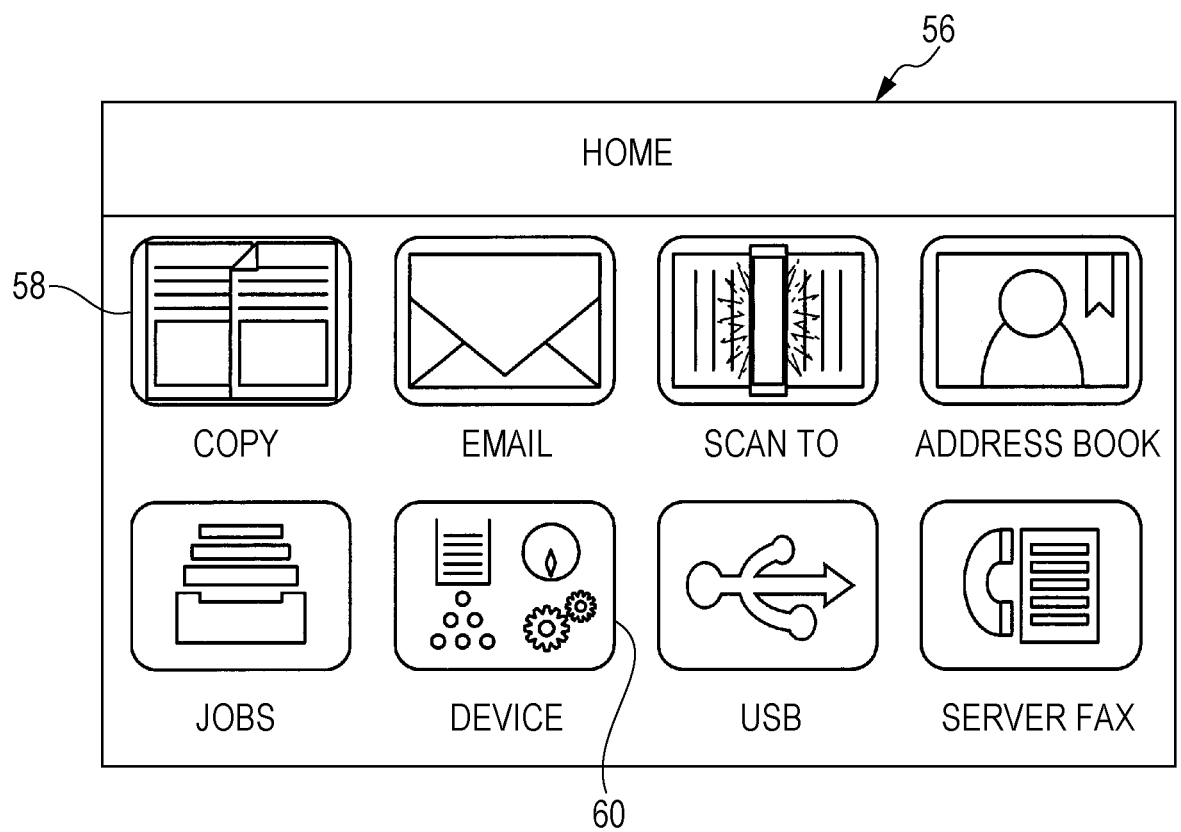
FIG. 4 is a screen diagram depicting a home screen in an information processing apparatus according to an exemplary embodiment of the present disclosure.

FIG. 4 depicts a home screen 56 generated by the home application 48. The home screen 56 displays operation buttons such as a copy button 58 for executing a job, and a device settings button 60.

Figure 5:
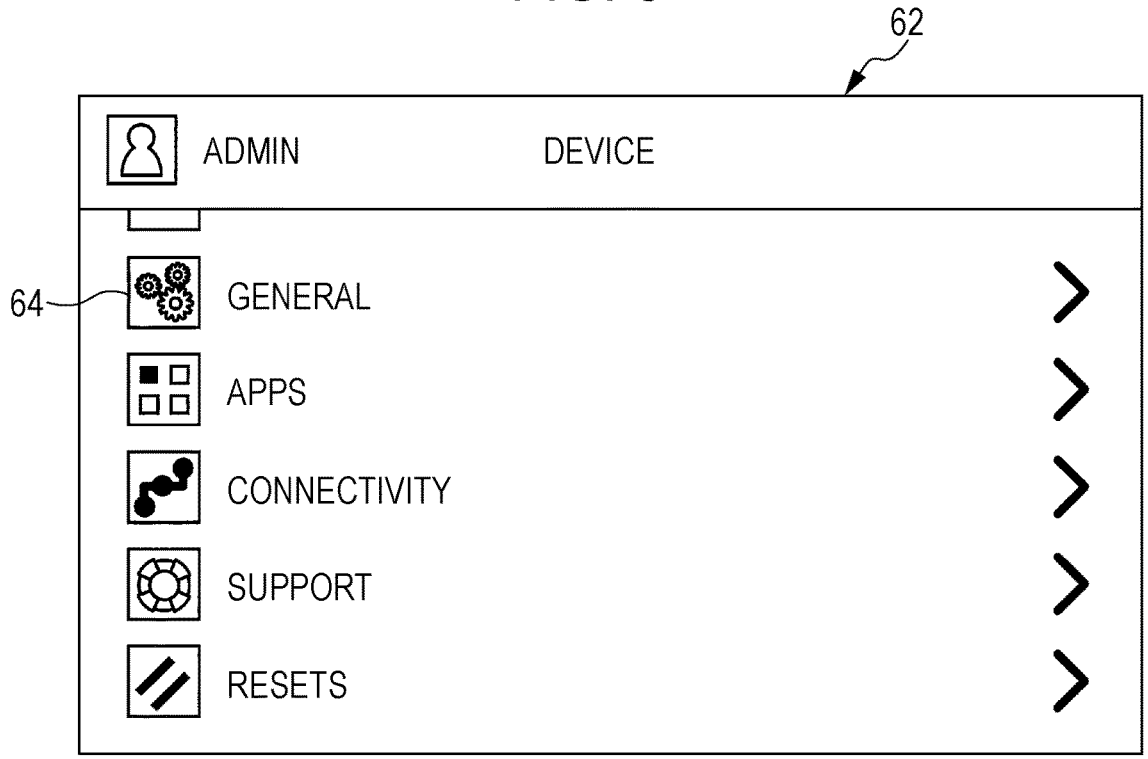
FIG. 5 is a screen diagram depicting a device settings screen in an information processing apparatus according to an exemplary embodiment of the present disclosure.

When the device settings button 60 is tapped, a device settings screen 62 is displayed, as depicted in FIG. 5. A general device settings button 64 is displayed on the device settings screen 62.

Figure 6:
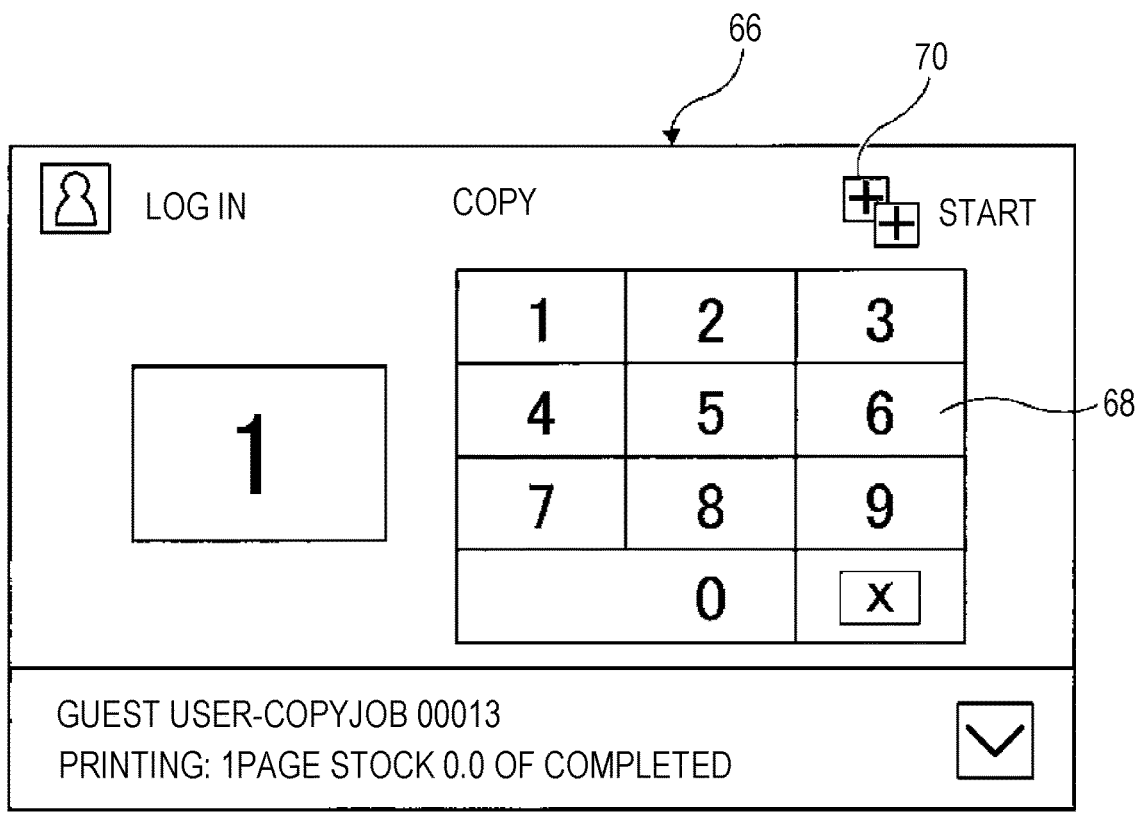
FIG. 6 is a screen diagram depicting a copy start screen in an information processing apparatus according to an exemplary embodiment of the present disclosure.

Furthermore, in the home screen 56, when the copy button 58 is tapped, a copy screen 66 is displayed, as depicted in FIG. 6. A numeric keypad 68 for setting a number of copies, a copy execution button 70, and the like are displayed on the copy screen 66.

Next, an operation flow of the information processing apparatus 10 will be described.

Figure 7:
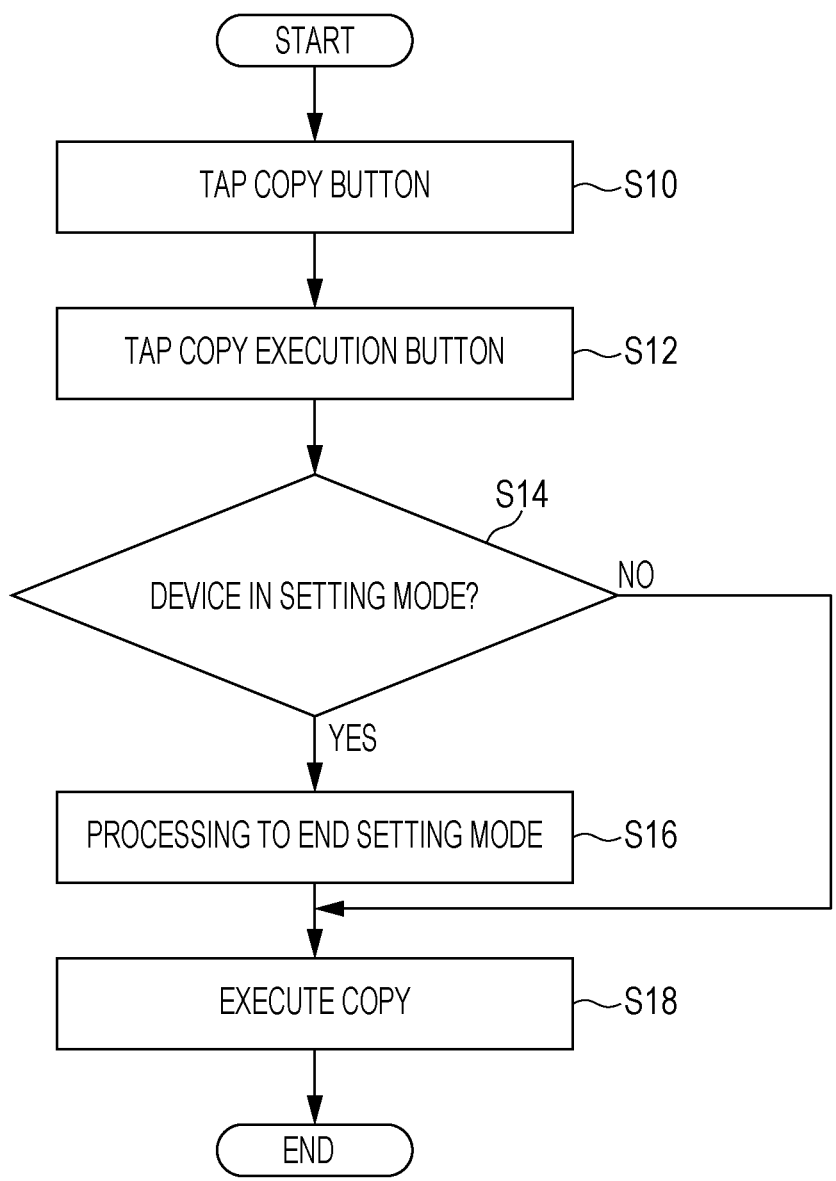
FIG. 7 is a flowchart depicting an operation flow of an information processing apparatus according to an exemplary embodiment of the present disclosure.

FIG. 7 is a flowchart depicting an operation flow according to an exemplary embodiment.

First, if in step S10 the home button 32 is tapped while the home screen 56 is open, and in the next step S12 the copy execution button 70 is tapped, processing proceeds to step S14.

In step S14, it is determined whether or not the device is in the setting mode. In this step S14, if it is determined that the device is transitioning to the setting mode, processing proceeds to step S16 in which processing to end the setting mode is carried out, and processing additionally proceeds to step S18 in which copying is executed, and processing ends.

However, in step S14, if it is determined that the device is not in the setting mode, processing proceeds to step S18 in which copying is executed in the current state, and processing ends.

Figure 8:
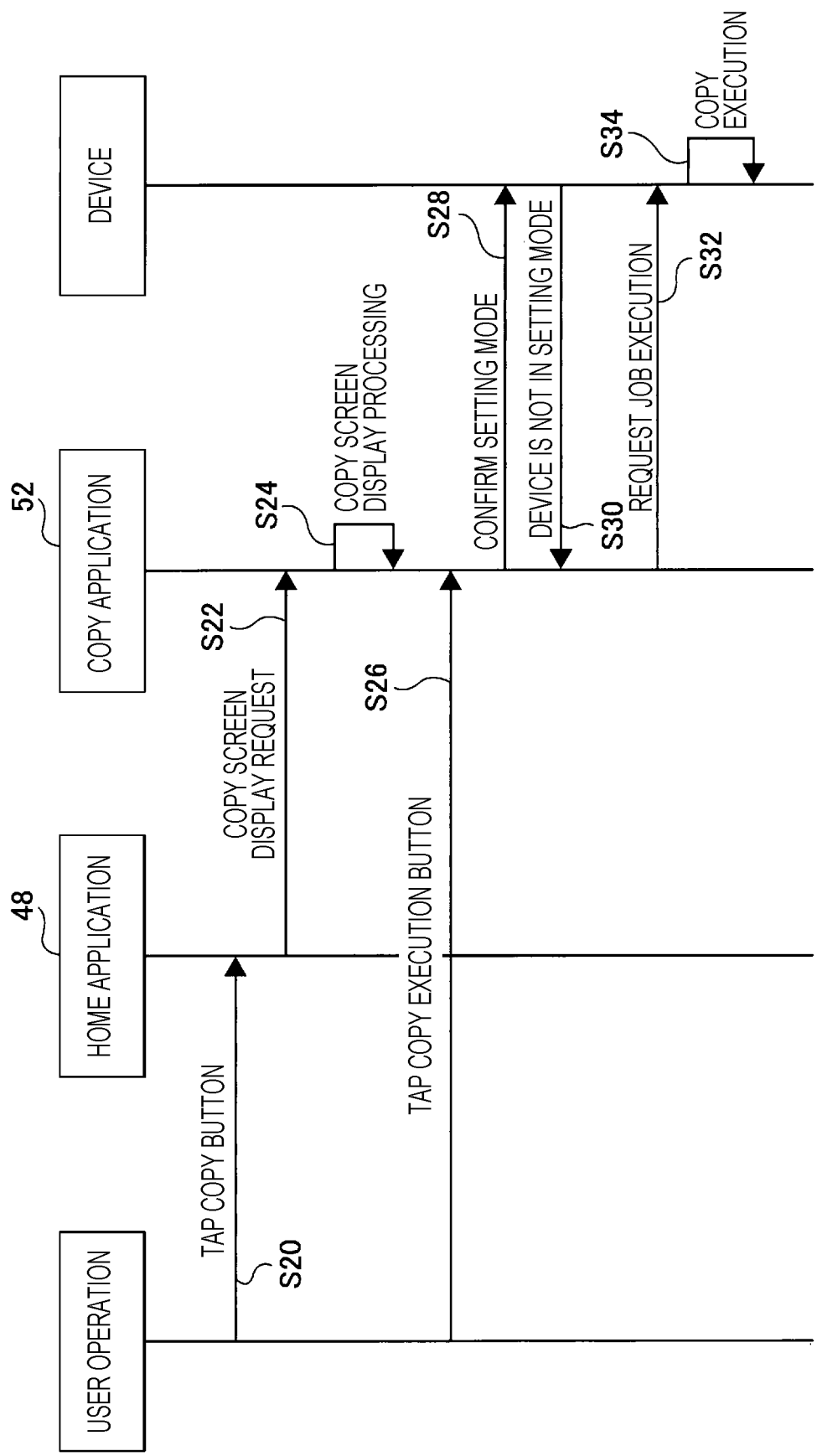
FIG. 8 is a sequence diagram depicting an operation flow in a case where a device is not in a setting mode, in an information processing apparatus according to an exemplary embodiment of the present disclosure.
Figure 9:
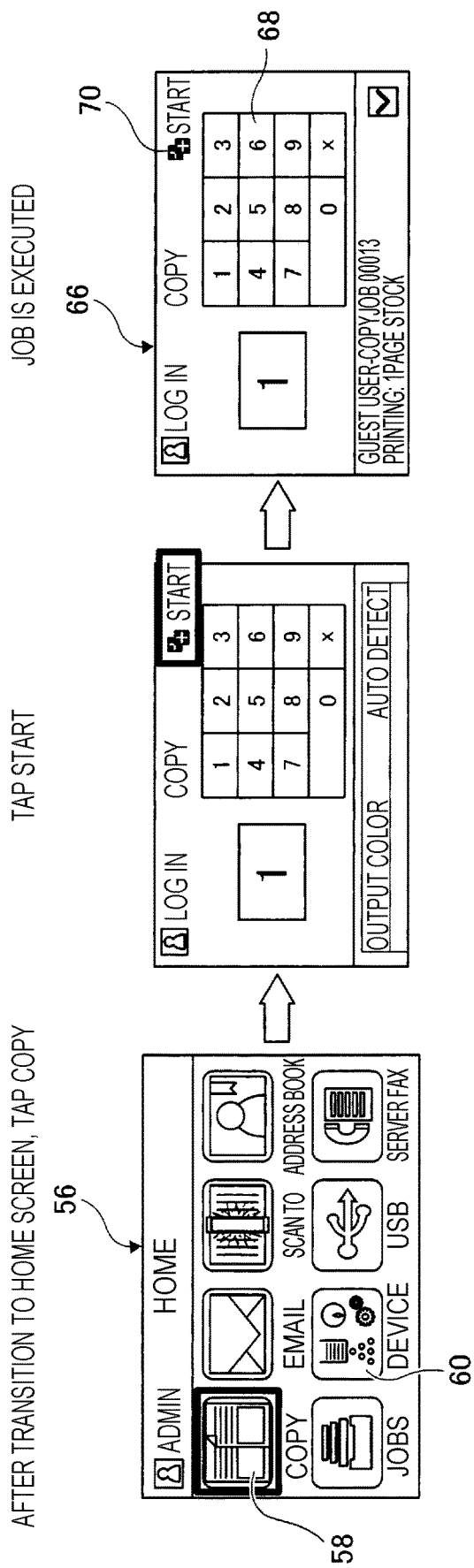
FIG. 9 is a screen transition diagram depicting transition between screens in a case where a home button is pressed after transition to a device setting mode has ended, in an operation flow of an information processing apparatus according to an exemplary embodiment of the present disclosure.

FIG. 8 is a sequence diagram depicting an operation flow in a case where the device is not in the setting mode, and FIG. 9 is a transition diagram depicting transition between screens in this case.

First, in step S20, if the user taps the copy button 58 while the home screen 56 is being displayed, the home application 48 receives indication that the copy button 58 has been tapped, and in step S22 requests the copy application 52 to display the copy screen 66. In step S24, the copy application 52 displays the copy screen 66.

Next, in step S26, if the user taps the copy execution button 70, the copy application 52 receives indication that the copy execution button 70 has been tapped, and in step 28 confirms whether or not the device is in the setting mode. In step S30, the device having been requested to confirm whether or not it is in setting mode notifies the copy application 52 that it is not in the setting mode.

In step S32, the copy application 52 having received the notification that the device is not in the setting mode requests the device to execute copying. In step S34, the device having received the copy execution request executes copying, and processing ends.

Figure 10:
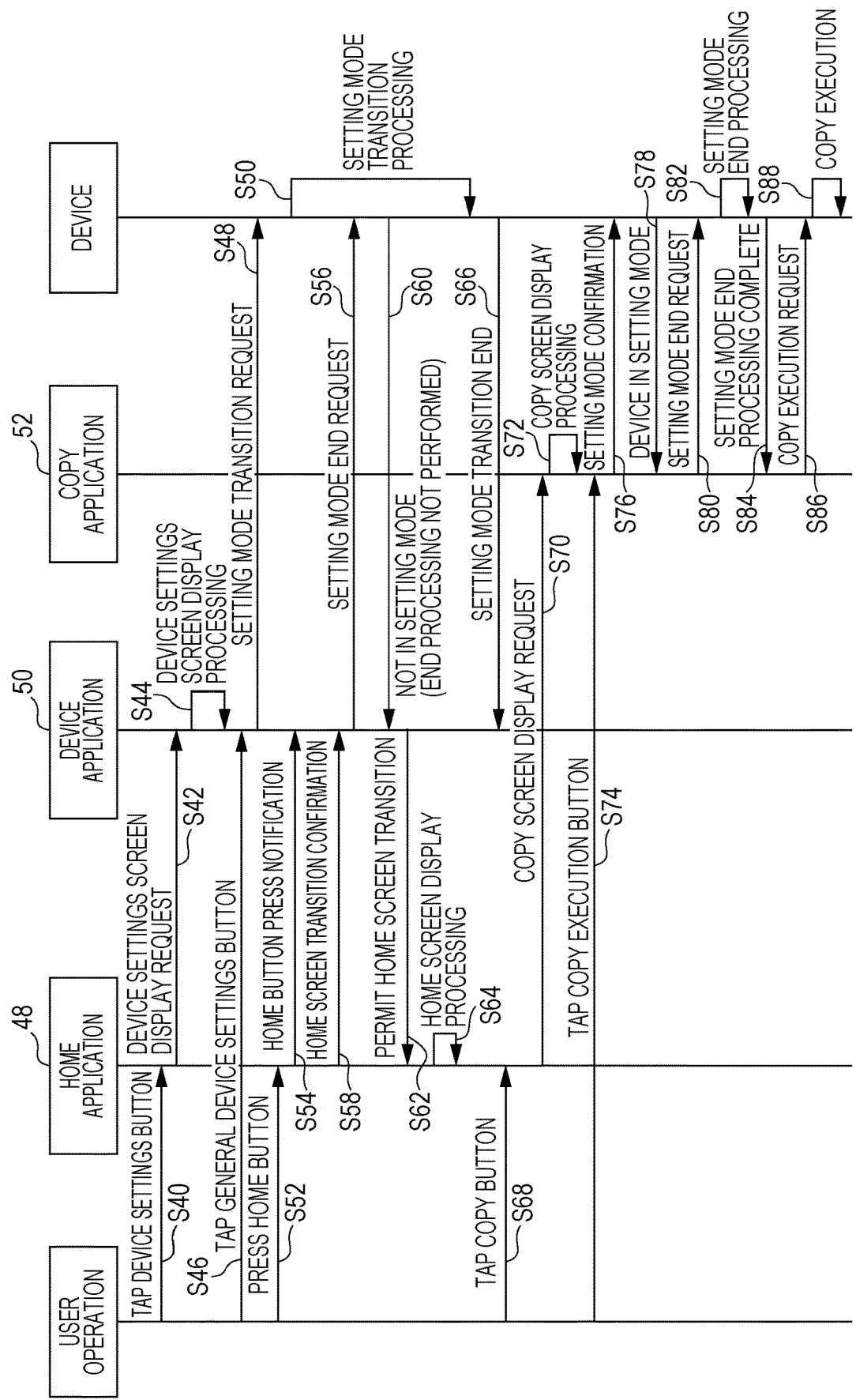
FIG. 10 is a sequence diagram depicting an operation flow in a case where a home button is pressed before transition to a device setting mode has ended, in an information processing apparatus according to an exemplary embodiment of the present disclosure.
Figure 11:
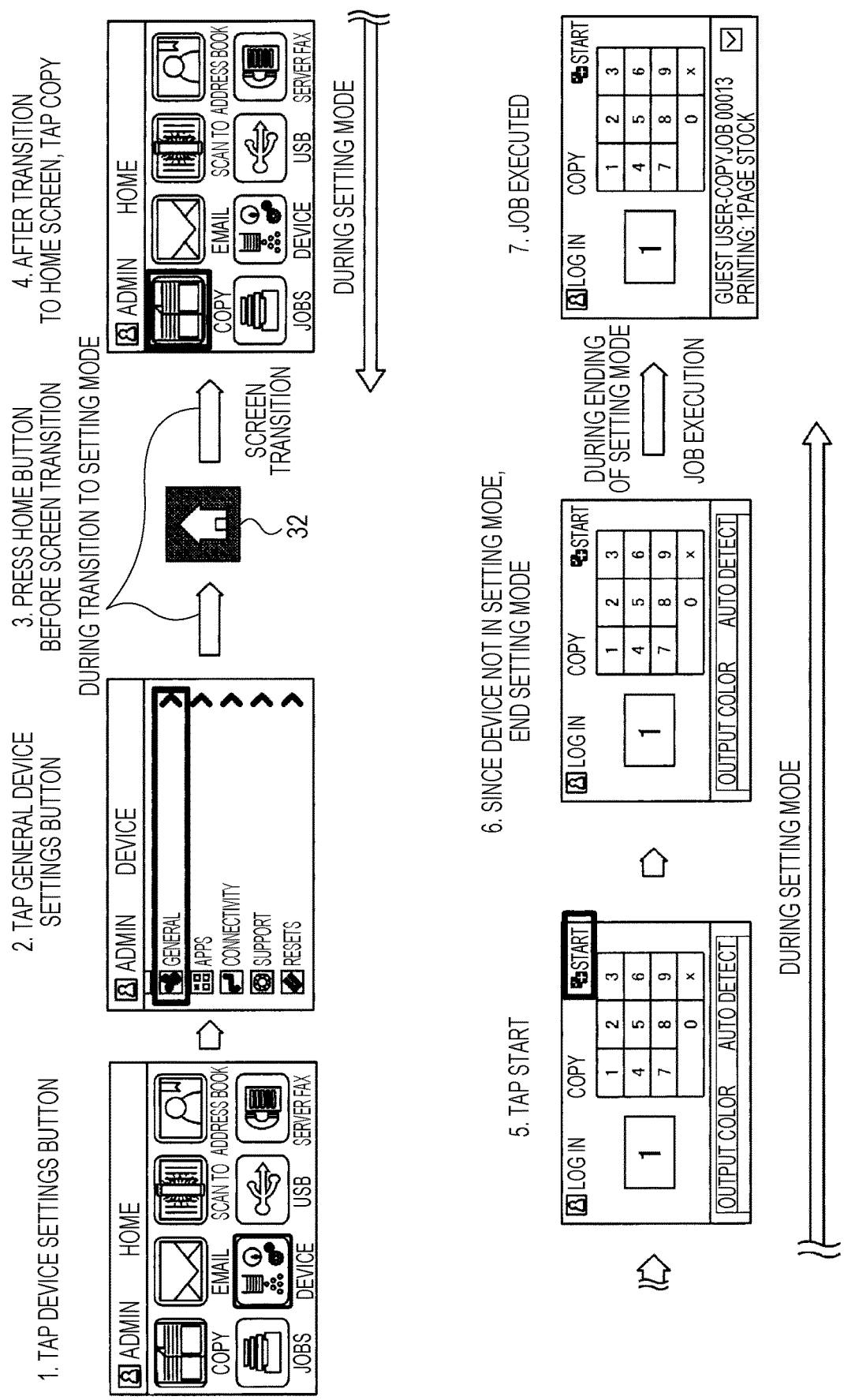
FIG. 11 is a screen transition diagram depicting transition between screens in a case where a home button is pressed before transition to a device setting mode has ended, in an operation flow of an information processing apparatus according to an exemplary embodiment of the present disclosure.

FIG. 10 is a sequence diagram depicting an operation flow in a case where the device is in the setting mode, and FIG. 11 is a transition diagram depicting transition between screens in this case.

First, in step S40, if the user taps the device settings button 60 while the home screen 56 is displayed, the home application 48 receives indication that the device settings button 60 has been tapped, and in step S42 requests the device application 50 to display the device settings screen 62. In step S44, the device application displays the device settings screen 62.

Next, in step S46, if the user taps the general device settings button 64, the device application 50 receives indication that the user has tapped the general device settings button 64, and in step S48 requests the device to transition to the setting mode. In step S50, the device having been requested to transition to the setting mode starts transitioning to the setting mode.

In step S52, if the user presses the home button 32 while the device is transitioning to the setting mode, the home application 48 receives indication that the home button 32 has been pressed, and in step S54 notifies the device application 50 that the home button 32 has been pressed. The device application 50, upon receiving the notification that the home button 32 has been pressed, in step S56 requests the device to end the setting mode. Furthermore, in step S58, the home application 48 requests the device application 50 to confirm whether or not to transition to the home screen.

The device having received a request to end the setting mode, in step S60, notifies the device application 50 that processing to transition to the setting mode is being carried out. In step 62, the device application 50 requests the home application 48 to display the home screen 56 regardless of the device carrying out processing to transition to the setting mode. In step S64, the home application 48 having received the request to display the home screen 56 displays the home screen 56.

When the processing of step S50 to transition to the setting mode ends, in step S66 the device notifies the device application 50 that the processing to transition to the setting mode has ended.

Next, in step S68, if the user taps the copy button 58, in step S70 the home application 48 requests the copy application 52 to display the copy screen 66. In step S72, the copy application 52 having received the request to display the copy screen 66 displays the copy screen 66.

Next, in step S74, if the user taps the copy execution button 70, in step S76 the copy application 52 confirms with the device whether or not the setting mode has ended. Here, since the device is in the setting mode, in step S78 the device notifies the copy application 52 that the device is in the setting mode.

In step S80, the copy application 52 having received the notification that the device is in the setting mode requests the device to end the setting mode. In step S82, the device having been requested to end the setting mode executes processing to end the setting mode. When the processing to end the setting mode ends, in step S84 the device notifies the copy application 52 that the processing to end the setting mode has ended. In step S86, the copy application 52 having received the notification that the processing to end the setting mode has ended requests the device to execute copying. In step S88, the device having received the copy execution request executes copying, and processing ends.

It should be noted that, although copying has been selected as one example of a job in the aforementioned exemplary embodiment, the present disclosure can also be similarly applied to other jobs. In addition, although an image forming apparatus has been given as an example of a device in the aforementioned exemplary embodiment, the present disclosure is not restricted thereto and can also be applied to a smartphone, a television remote control, or the like.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor programmed to:
receive a request to transition to a setting mode in which a device is prohibited from performing an operation;
before the transition to the setting mode is completed, receive a request to display a home screen;
on the displayed home screen, receive an instruction to execute the operation of the device while the transition to the setting mode is completed; and
upon receiving the instruction to execute the operation of the device on the displayed home screen, automatically cancel prohibition of the operation of the device.

2. The information processing apparatus according to claim 1,
wherein, in a case where the prohibition of the operation of the device is canceled, a job to be performed by the device is executed without the user providing the instruction to execute the operation again.

3. The information processing apparatus according to claim 1,
wherein, when the transition to the setting mode is completed, a state where the device is prohibited from performing the operation is entered.

4. The information processing apparatus according to claim 2,
wherein, when the transition to the setting mode is completed, a state where the device is prohibited from performing the operation is entered.

5. The information processing apparatus according to claim 1, wherein the processor is programmed to
determine whether or not a state where the device is prohibited from performing the operation has been entered.

6. The information processing apparatus according to claim 2, wherein the processor is programmed to
determine whether or not a state where the device is prohibited from performing the operation has been entered.

7. The information processing apparatus according to claim 3, wherein the processor is programmed to
determine whether or not a state where the device is prohibited from performing the operation has been entered.

8. The information processing apparatus according to claim 4, wherein the processor is programmed to
   determine whether or not a state where the device is prohibited from performing the operation has been entered.

9. The information processing apparatus according to claim 1, wherein the processor is programmed to:
   receive an instruction to return to the home screen from a settings screen with which the device is set; and
   perform control so as to return to the home screen with a state where the device is prohibited from performing the operation being maintained, in a case where the instruction to return to the home screen is received between commencement of processing to transition to the setting mode of the device and completion of the processing to transition to the setting mode.

10. The information processing apparatus according to claim 2, wherein the processor is programmed to:
    receive an instruction to return to the home screen from a settings screen with which the device is set; and
    perform control so as to return to the home screen with a state where the device is prohibited from performing the operation being maintained, in a case where the instruction to return to the home screen is received between commencement of processing to transition to the setting mode of the device and completion of the processing to transition to the setting mode.

11. The information processing apparatus according to claim 3, wherein the processor is programmed to:
    receive an instruction to return to the home screen from a settings screen with which the device is set; and
    perform control so as to return to the home screen with a state where the device is prohibited from performing the operation being maintained, in a case where the instruction to return to the home screen is received between commencement of processing to transition to the setting mode of the device and completion of the processing to transition to the setting mode.

12. The information processing apparatus according to claim 4, wherein the processor is programmed to:
    receive an instruction to return to the home screen from a settings screen with which the device is set; and
    perform control so as to return to the home screen with a state where the device is prohibited from performing the operation being maintained, in a case where the instruction to return to the home screen is received between commencement of processing to transition to the setting mode of the device and completion of the processing to transition to the setting mode.

13. The information processing apparatus according to claim 5, wherein the processor is programmed to:
    receive an instruction to return to the home screen from a settings screen with which the device is set; and
    perform control so as to return to the home screen with a state where the device is prohibited from performing the operation being maintained, in a case where the instruction to return to the home screen is received between commencement of processing to transition to the setting mode of the device and completion of the processing to transition to the setting mode.

14. The information processing apparatus according to claim 6, wherein the processor is programmed to:
    an instruction to return to the home screen from a settings screen with which the device is set; and
    perform control so as to return to the home screen with a state where the device is prohibited from performing the operation being maintained, in a case where the instruction to return to the home screen is received between commencement of processing to transition to the setting mode of the device and completion of the processing to transition to the setting mode.

15. The information processing apparatus according to claim 7, wherein the processor is programmed to:
    receive an instruction to return to the home screen from a settings screen with which the device is set; and
    perform control so as to return to the home screen with a state where the device is prohibited from performing the operation being maintained, in a case where the instruction to return to the home screen is received between commencement of processing to transition to the setting mode of the device and completion of the processing to transition to the setting mode.

16. The information processing apparatus according to claim 8, wherein the processor is programmed to:
    receive an instruction to return to the home screen from a settings screen with which the device is set; and
    perform control so as to return to the home screen with a state where the device is prohibited from performing the operation being maintained, in a case where the instruction to return to the home screen is received between commencement of processing to transition to the setting mode of the device and completion of the processing to transition to the setting mode.

17. A device control apparatus comprising:
    an operation display; and
    a processor programmed to:
    receive a request to transition to a setting mode in which a device is prohibited from performing an operation;
    before the transition to the setting mode is completed, receive a request to display a home screen on the operation display;
    on the displayed home screen, receive an instruction to execute the operation of the device while the transition to the setting mode is completed; and
    upon receiving the instruction to execute the operation of the device on the displayed home screen, automatically cancel prohibition of the operation of the device.

18. A non-transitory computer readable medium storing a program causing a computer to execute a process comprising:
    receiving a request to transition to a setting mode in which a device is prohibited from performing an operation;
    before the transition to the setting mode is completed, receiving a request to display a home screen;
    on the displayed home screen, receiving an instruction to execute the operation of the device while the transition to the setting mode is completed; and
    upon receiving the instruction to execute the operation of the device on the displayed home screen, automatically canceling prohibition of the operation of the device.

* * * * *